(12) United States Patent
Möll

(10) Patent No.: US 6,986,687 B2
(45) Date of Patent: Jan. 17, 2006

(54) INSTRUMENT PANEL FOR A MOTOR VEHICLE

(75) Inventor: Winfried Möll, Laubach-Röthges (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 10/091,380

(22) Filed: Mar. 4, 2002

(65) Prior Publication Data

US 2002/0155733 A1  Oct. 24, 2002

(30) Foreign Application Priority Data

| Mar. 7, 2001 | (DE) | 101 11 024 |
| May 31, 2001 | (DE) | 101 26 705 |

(51) Int. Cl.
   *H01R 13/02*   (2006.01)

(52) U.S. Cl. .................................................. 439/888
(58) Field of Classification Search ............... 439/76.2, 439/507, 510, 888
See application file for complete search history.

(56) References Cited

U.S. PATENT DOCUMENTS

| 3,668,606 A | * | 6/1972 | Walter ........................ 439/510 |
| 3,740,693 A | * | 6/1973 | Gorman ....................... 439/888 |
| 5,203,623 A | * | 4/1993 | Viertel et al. ................ 362/135 |
| 5,584,208 A | * | 12/1996 | Ha ................................ 74/331 |
| 5,785,532 A | * | 7/1998 | Maue et al. .................. 439/34 |
| 6,231,354 B1 | * | 5/2001 | Church et al. ............. 439/76.1 |
| 6,371,548 B1 | * | 4/2002 | Misaras .................... 296/146.7 |

FOREIGN PATENT DOCUMENTS

| DE | 4139434 | 6/1992 |
| DE | 4409183 | 10/1994 |
| EP | 0334343 | 9/1989 |
| EP | 1076341 | 2/2001 |
| FR | 2365893 | 4/1978 |

OTHER PUBLICATIONS

Patent Abstracts of Japan, vol. 1998, No. 10, Aug. 31, 1998, & JP 10 136541 A (Harness Sogo Gijutsu Kenkyusho: KK; Sumitomo Wiring Syst LTD); Sumitomo E), May 22, 1998.
Patent Abstracts of Japan, vol. 1998, No. 5, Apr. 30, 1998, & JP 10 016688 A (INOAC COPR), Jan. 20, 1998.

* cited by examiner

*Primary Examiner*—Tulsidas C Patel
(74) *Attorney, Agent, or Firm*—Martin A. Farber

(57) ABSTRACT

In an instrument panel (18) for a motor vehicle having a carrier (19), electrical leads (24) are stretched between contact pins (22, 23) of an electronic component (21) and/or a plug part (20). The contact pins (22, 23) are pressed into the carrier (19). This makes mounting the electrical leads (24) on the instrument panel (18) particularly easy.

17 Claims, 3 Drawing Sheets

INSTRUMENT PANEL FOR A MOTOR VEHICLE

FIELD AND BACKGROUND OF THE INVENTION

The invention relates to an instrument panel for a motor vehicle having at least one electronic component which is arranged on a carrier, and/or one plug part, having electrical leads which are conductively connected to the electronic component and/or to the plug part.

Such instrument panels are frequently used in the region of a dashboard in contemporary motor vehicles and are known from practice. The electronic components are embodied, for example, as a speedometer, revolution counter or control device and are plugged onto the plug parts which are attached to the carrier or directly attached to the carrier. Leads which lead away from the dashboard can also be plugged onto the plug parts. As a rule, a plurality of leads are premounted in a cable harness and connected individually to contacts of the electronic components or of the plug parts. The cable harness is then attached to the carrier. The electrical leads which are laid in the cable harness are individually electrically insulated.

A disadvantage with the known instrument panel is that the mounting of the leads is very complex and cannot be automated.

SUMMARY OF THE INVENTION

The invention is based on the problem of embodying an instrument panel of the type specified at the beginning in such a way that it can be mounted as easily and cost-effectively as possible.

This problem is solved according to the invention in that the carrier has protruding contact pins which are connected to the electronic component and/or to the plug part, and it that the electrical leads are attached to the contact pins.

By virtue of this configuration, the electrical leads can be individually attached to the contact pins in a mechanically reliable way and can be stretched, for example, to a main plug part of the instrument panel according to the invention. The arrangement of a plurality of leads in a cable harness is not necessary thanks to the invention. Because the pins are easily accessible and can be fixed in position with a high degree of precision, the mounting of the leads can also be automated. The instrument panel according to the invention can therefore be mounted in a particularly cost-effective way.

According to one advantageous development of the invention, the contact pins are capable of supporting large tensile forces from the leads if they are arranged transversely with respect to the longitudinal extent of the leads.

The ends of the electrical leads could be, for example, screwed or clamped to the contact pins. However, according to one advantageous development of the invention, the attachment of the leads to the contact pins has reliable electrical contact and a high degree of mechanical stability if a connection of the ends of the electrical leads to the contact pins is embodied in a materially joined way. Welding or soldering, for example, is suitable as the materially joined connection.

The points at which mechanical loads on the leads are supplied to the contact pins can, according to another advantageous development of the invention, be easily spatially separated from the points at which electrical contact is made if the ends of the electrical leads are wound around the contact pins. A further advantage of this refinement is that the leads can be connected to the contact pins in a particularly fast and cost-effective way, in particular using automated means.

According to another advantageous development of the invention, electrical connections arranged between plug parts and electronic components are embodied in a particularly structurally simple way if the electrical leads are stretched between two contact pins.

According to another advantageous development of the invention, the mounting of the contact pins is particularly easy if they are pressed into the carrier.

As in the known instrument panel, the electrical leads could be individually electrically insulated. According to another advantageous development of the invention, the electrical insulation of the leads is particularly cost-effective if the electrical leads are insulated by plastic foam which is arranged on the carrier, and are secured in a position in which they are spatially separated from one another. As a result, it is possible to dispense with the arrangement of insulating layers on each individual lead. Plastic foam is usually necessary in any case to shape the dashboard on which the instrument panel is located.

The instrument panel according to the invention is particularly compact if a plurality of electrical leads are arranged in a common plane.

According to another advantageous development of the invention, the mounting of the contact pins is particularly cost-effective if the contact pins and the plug part and/or the electronic component are embodied as a premountable physical unit. This enables a separate operation for mounting the contact pins on the carrier to be avoided.

According to another advantageous development of the invention, the electrical leads can easily be laid around places with differing heights on the carrier or laid over these places if guide elements for the electrical leads are arranged on the carrier. The electrical leads can be diverted at these guide elements.

BRIEF DESCRIPTION OF THE DRAWING

The invention permits numerous embodiments. In order to clarify its basic principle further, a plurality of said embodiments are illustrated in the drawing and will be described below. In the drawing.

DETAILED DESCRIPTION OF THE PREFERRED EMBODIMENT

Figure 1:
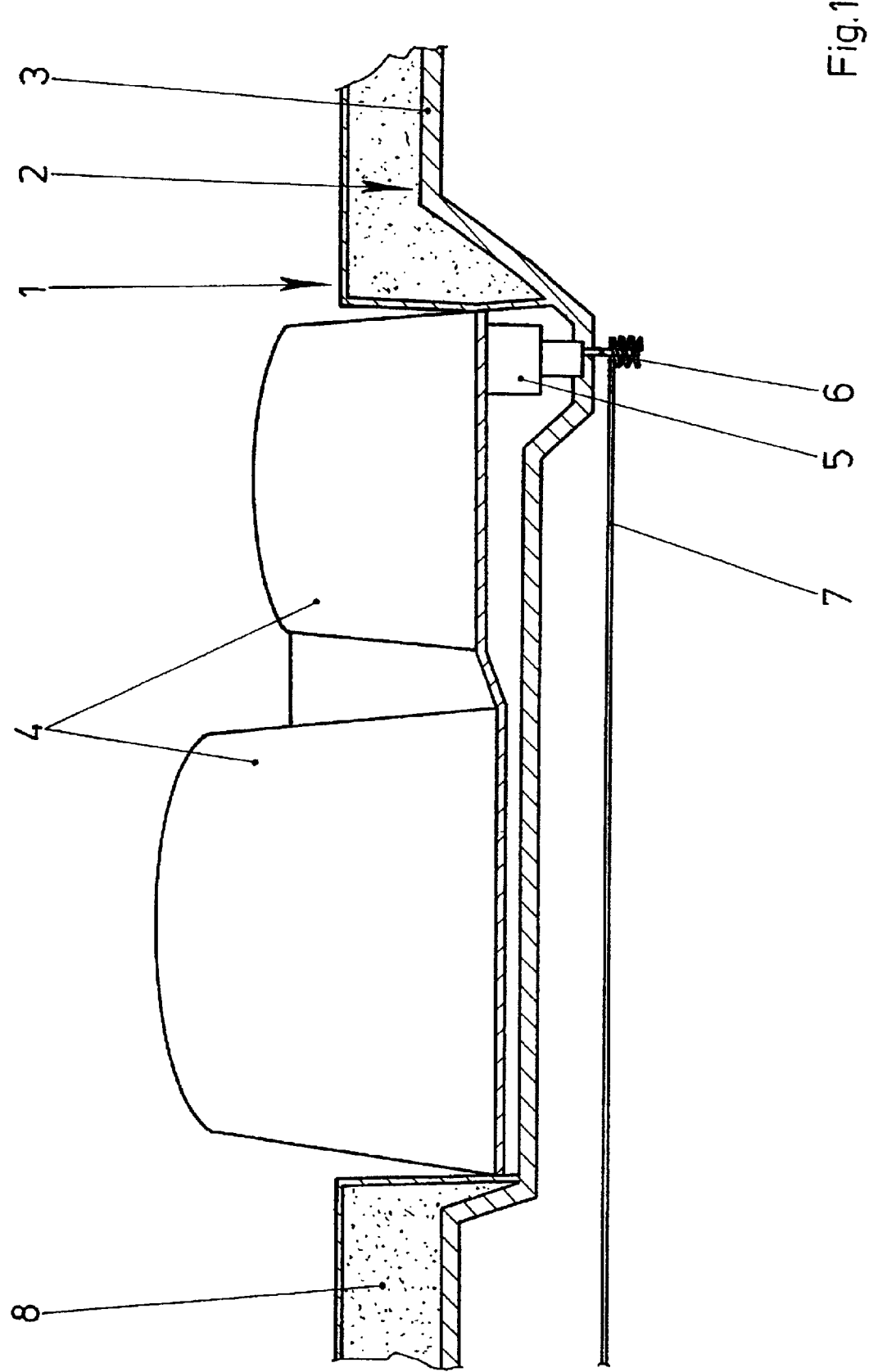
FIG. 1 shows a sectional view through a region of a dashboard with an instrument panel according to the invention.

FIG. 1 shows a sectional view through a dashboard 1 for a motor vehicle with an instrument panel 2. The instrument panel 2 has a carrier 3 which is fabricated from electrically non-conductive plastic. Two electronic components 4 which are embodied as measuring units are arranged on the carrier 3. The electronic components 4 which are embodied as measuring units may be, for example, a revolution counter and a speedometer. The electronic components 4 have a terminal 5 and are connected to a contact pin 6 which penetrates the carrier 3. The contact pin 6 is pressed, for example, into the carrier 3. An electrical lead 7 is attached to the contact pin 6 on the side of the carrier 3 which faces away from the electronic components 4. The end of the electrical lead 7 is wound around the contact pin 6 here and/or welded or soldered to it. The electrical lead 7 is laid to a terminal not illustrated) of the instrument panel 2. In order to simplify the drawing, only a single contact pin 6 with a single electrical lead 7 is illustrated of course, all the connections which are provided for making electrical contact with the electronic component 4 may each have an illustrated contact pin 6. Furthermore, FIG. 1 shows that a plastic foam 8 is applied on the side of the carrier 3 which has the electronic components 4. The line 7 is insulated on the side facing away from the electronic components 4 of the carrier 3.

Figure 2:
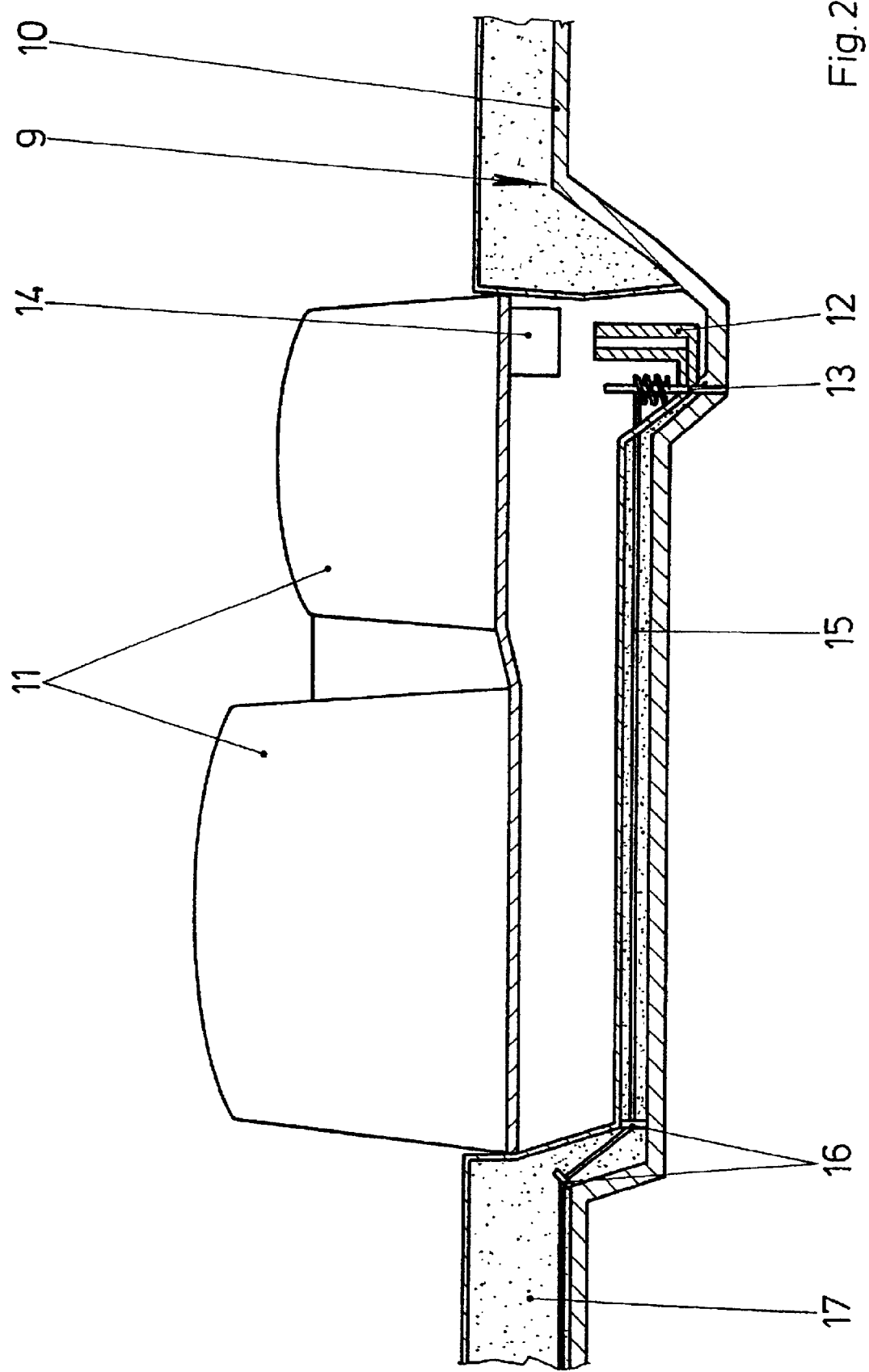
FIG. 2 shows a sectional view through a further embodiment of the instrument panel according to the invention.

FIG. 2 shows an instrument panel 9 with a carrier 10 before electronic components 11 which are embodied as measuring units are mounted. A plug part 12 with a contact pin 13 is attached to the carrier 10. The plug part 12 is used to connect to a correspondingly configured plug part 14 of the electronic components 11. One end of an electrical lead 15 is wound around the contact pin 13. The electrical lead 15 is arranged on the side of the carrier 10 facing the electronic components 11 and is laid, for example stretched, along a plurality of guide elements 16. In the region of the electrical lead 15, the carrier 10 has a layer of plastic foam 17. This plastic foam 17 insulates the electrical lead 15. For this reason, a plurality of electrical leads 15 to be laid do not require separate insulation.

Figure 3:
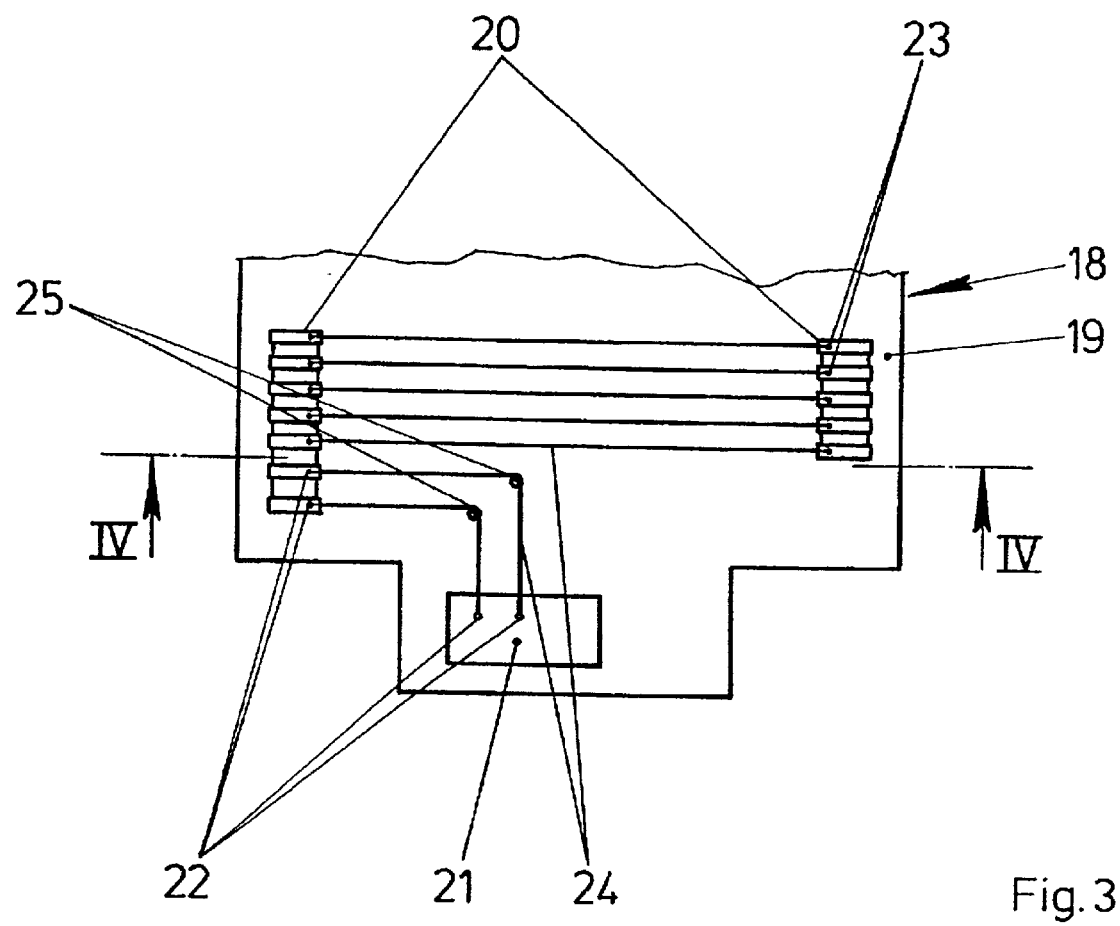
FIG. 3 shows a plan view of a further embodiment of the instrument panel.
Figure 4:
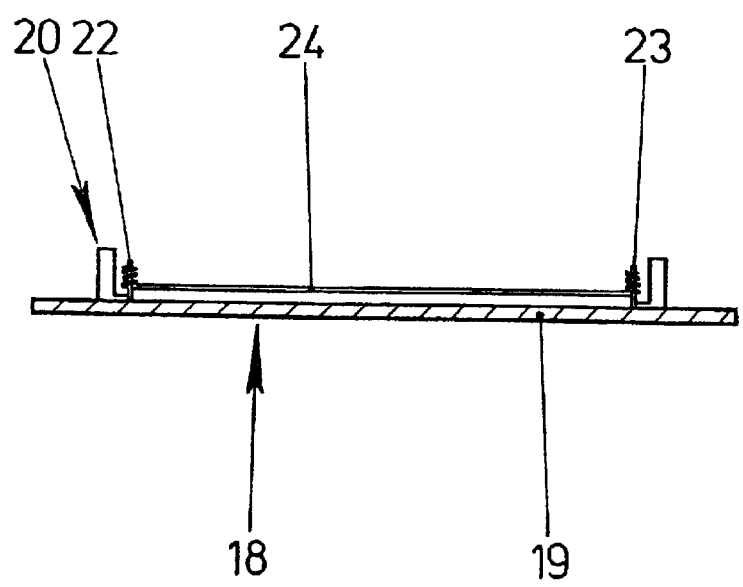
FIG. 4 shows a sectional view through the instrument panel from FIG. 3 along the line IV—IV.

FIG. 3 shows a region of an instrument panel 18 in a plan view in which two plug parts 20 and an electronic component 21 which is embodied as a vehicle electrical system controller are attached to a carrier 19. It goes without saying that the electronic component 21 can have further contact (not illustrated). The plug parts 20 and the electronic component 21 each have contact pins 22, 23 to which electrical leads 24 are attached. Furthermore, guide elements 25 for guiding the electrical leads 24 are arranged on the carrier 19. FIG. 4 shows, in a sectional view along the line IV—IV through the instrument panel 18 from FIG. 3, that the electrical leads 24 are arranged in one plane.

I claim:

1. An instrument panel, suitable for use with a motor vehicle, comprising at least one electronic component, a carrier supporting the at least one electronic component, and/or one plug part supported by the carrier, electrical leads which are conductively connected to the electronic component and/or the plug part, wherein the carrier has contact pins protruding from the carrier, which pins are connected to the at least one electronic component and/or to the plug part, each of the electrical leads is attached to and extends between two of the contact pins, the leads are held in spaced-apart relationship by guide elements extending from the carrier, and the guide elements have the configuration of pins protruding from the carrier.

2. The instrument panel as claimed in claim 1, wherein the contact pins (6, 13, 22, 23) are arranged transversely with respect to longitudinal extent of the leads (7, 15, 24).

3. The instrument panel as claimed in claim 1, wherein a connection of ends of the electrical leads (7, 15, 24) to the contact pins (6, 13, 22, 23) is a materially joined connection.

4. The instrument panel as claimed in claim 1, wherein ends of the electrical leads (7, 15, 24) are wound around the contact pins (6, 13, 22, 23).

5. The instrument panel as claimed in claim 1, wherein the electrical leads (7, 15, 24) are stretched between two of the contact pins (6, 13, 22, 23).

6. The instrument panel as claimed in claim 1, wherein the contact pins (6, 13, 22, 23) are pressed into the carrier (3, 10, 19).

7. The instrument panel as claimed in claim 1, wherein a plurality of the electrical leads (7, 15, 24) are arranged in a common plane.

8. The instrument panel as claimed in claim 1, wherein said contact pins (6, 13, 22, 23) and the plug part (12, 20) and/or the electronic component (4, 11, 21) are formed as a premountable physical unit.

9. The instrument panel as claimed in claim 1, wherein an individual one of the electrical leads is attached to a contact pin on a side of the carrier facing away from the electronic component.

10. The instrument panel as claimed in claim 1, wherein the electronic component is a measuring unit.

11. The instrument panel as claimed in claim 5, wherein the measuring unit is at least one of a speedometer and a revolutions counter.

12. The instrument panel as claimed in claim 1, wherein an electrical lead is stretched along a plurality of the guide elements.

13. An instrument panel according to claim 1, wherein each of said electrical leads comprises an electric wire stretched between its two contact pins.

14. An instrument panel according to claim 13, wherein the carrier is constructed of electrically nonconductive material, and the instrument panel further comprises a layer of plastic foam disposed on the carrier for insulating the electrical leads.

15. An instrument panel according to claim 1, wherein the electrical leads are located on a side of the carrier facing the at least one electronic component and/or plug part.

16. An instrument panel for a motor vehicle according to claim 1, wherein the electrical leads (15) are insulated by plastic foam (17) that is arranged on the carrier (10), and are secured in a position in which they are separated from one another.

17. An instrument panel for a motor vehicle according to claim 1, wherein the guide elements are located for holding the electrical leads generally parallel to a surface of the carrier.

* * * * *